United States Patent
Brines et al.

(10) Patent No.: US 8,955,912 B2
(45) Date of Patent: Feb. 17, 2015

(54) SEAT ASSEMBLY HAVING A FOLDABLE SEAT BACK

(71) Applicant: Lear Corporation, Southfield, MI (US)

(72) Inventors: Eric Brines, White Lake, MI (US); Karl Schafer, Holly, MI (US); Mike Wilson, Belleville, MI (US)

(73) Assignee: Lear Corporation, Southfield, MI (US)

( * ) Notice: Subject to any disclaimer, the term of this patent is extended or adjusted under 35 U.S.C. 154(b) by 77 days.

(21) Appl. No.: 13/886,503

(22) Filed: May 3, 2013

(65) Prior Publication Data

US 2014/0327285 A1 Nov. 6, 2014

(51) Int. Cl.
*B60N 2/02* (2006.01)
*A47C 1/024* (2006.01)

(52) U.S. Cl.
CPC .................................... *A47C 1/024* (2013.01)
USPC .................................... 297/378.1; 297/354.1

(58) Field of Classification Search
USPC ............................... 297/354.1, 378.1, 378.12
See application file for complete search history.

(56) References Cited

U.S. PATENT DOCUMENTS

| | | | |
|---|---|---|---|
| 4,182,193 A | | 1/1980 | Schultz, Jr. |
| 5,340,195 A | | 8/1994 | Notta |
| 5,690,386 A | * | 11/1997 | Chabanne ................. 297/367 R |
| 5,700,058 A | | 12/1997 | Balagurumurthy et al. |
| 5,927,808 A | | 7/1999 | Esker |
| 6,139,104 A | * | 10/2000 | Brewer ........................ 297/353 |
| 6,910,739 B2 | * | 6/2005 | Grable et al. ............ 297/378.12 |
| 7,134,724 B2 | * | 11/2006 | Chabanne et al. ............ 297/366 |
| 7,364,237 B2 | * | 4/2008 | Grable et al. .............. 297/378.1 |
| 2003/0102705 A1 | * | 6/2003 | Pejathaya et al. ........ 297/378.12 |

* cited by examiner

*Primary Examiner* — Philip Gabler
(74) *Attorney, Agent, or Firm* — Brooks Kushman P.C.

(57) ABSTRACT

A seat assembly having a foldable seat back. The seat assembly may have an upper bracket that may be connected to a recliner mechanism that may be configured to rotate about a first axis. A rivet may be disposed on the upper bracket and may rotate about a second axis.

20 Claims, 6 Drawing Sheets

SEAT ASSEMBLY HAVING A FOLDABLE SEAT BACK

TECHNICAL FIELD

This application relates to a seat assembly having a foldable seat back.

BACKGROUND

A vehicle seat hinge assembly is disclosed in U.S. Pat. No. 5,340,195.

SUMMARY

In at least one embodiment, a seat assembly is provided. The seat assembly may have a recliner mechanism, an upper bracket, a rivet, an attachment plate, a puck, and a latch. The recliner mechanism may be configured to rotate about a first axis. The upper bracket may be connected to the recliner mechanism. The rivet may be disposed on the upper bracket and may be configured to rotate about a second axis. The attachment plate may be fixedly disposed on the rivet and a seat back frame. The puck may be fixedly disposed on the rivet. The latch may be rotatably disposed on the upper bracket. The latch may cooperate with the puck to control rotation of the seat back frame about the second axis.

In at least one embodiment, a seat assembly is provided. The seat assembly may include a recliner mechanism, a lower bracket, an upper bracket, a rivet, an attachment plate, and a puck. The recliner mechanism may rotate about a first axis. The lower bracket may connect the recliner mechanism to a seat bottom frame. The upper bracket may extend between the recliner mechanism and a seat back frame. The rivet may extend through the upper bracket and may be configured to rotate about a second axis. The attachment plate may be fixedly disposed on the rivet and the seat back frame. The puck may be fixedly disposed on the rivet for controlling rotation of the seat back frame about the second axis. The upper bracket may be disposed between the attachment plate and the puck.

In at least one embodiment, a seat assembly is provided. The seat assembly may include an upper bracket, a rivet, an attachment plate, a puck, and a latch. The upper bracket may be connected to a recliner mechanism that may rotate about a first axis. The rivet may be disposed on the upper bracket and may be configured to rotate with respect to the upper bracket about a second axis. The attachment plate may be fixedly disposed on the rivet and the seat back frame. The puck may be fixedly disposed on the rivet. The puck may have first and second protrusions that extend away from the second axis. The latch may be disposed on the upper bracket and may be configured to rotate about a third axis. The latch may engage the first protrusion to inhibit rotation of the seat back frame about the second axis. The latch may disengage the first protrusion to permit rotation of the seat back frame about the second axis.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
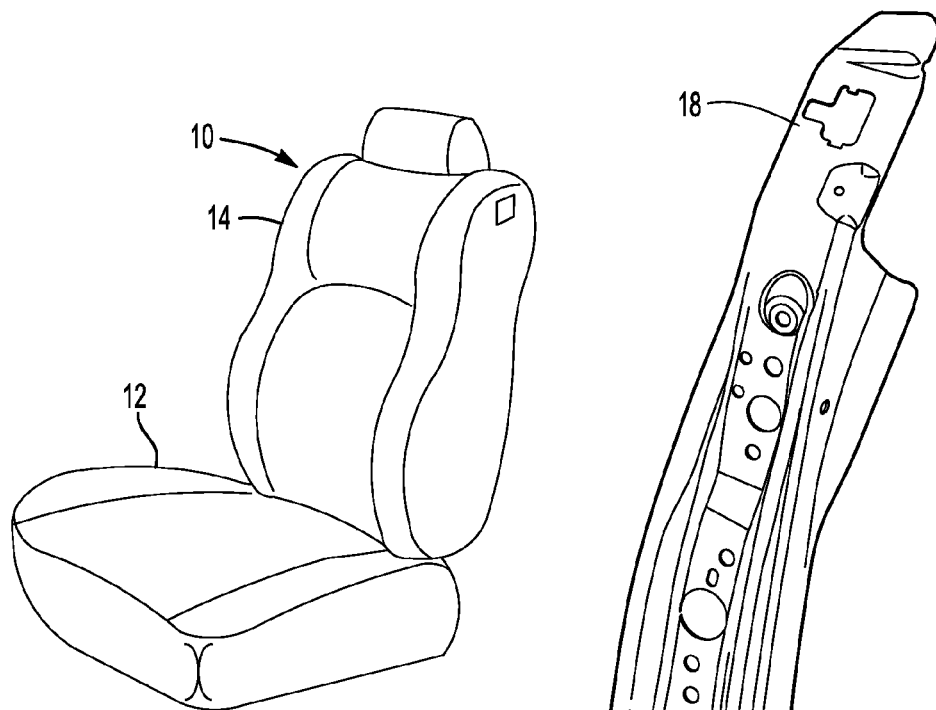
FIG. 1 is a perspective view of a seat assembly.

Referring to FIG. 1, an exemplary seat assembly 10 is shown. The seat assembly 10 may be configured for use with a vehicle, such as a motor vehicle like a car or truck. The seat assembly 10 may include a seat bottom 12 and a seat back 14.

Figure 2:
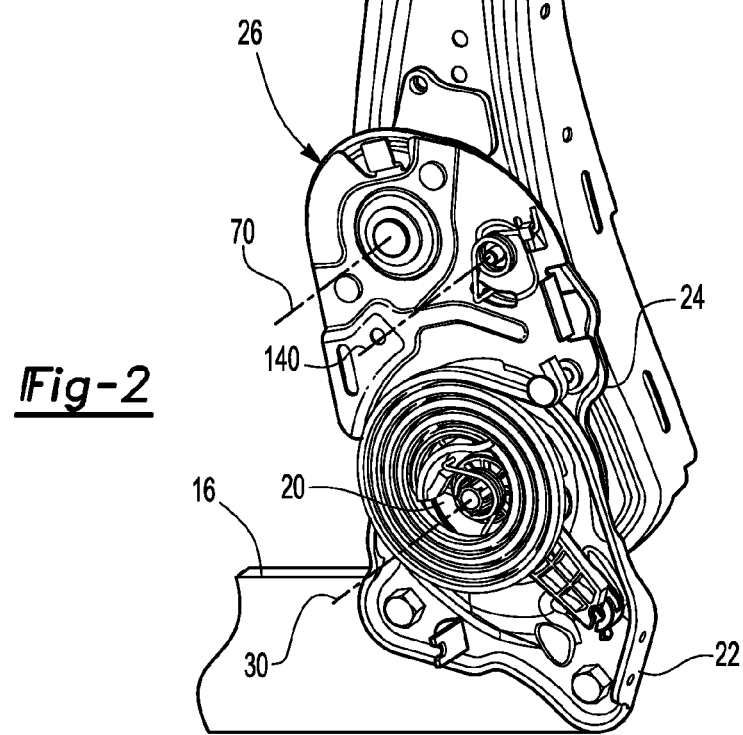
FIG. 2 is a side perspective view of a portion of a seat assembly.

The seat bottom 12 may be configured to support a seat occupant. As is best shown in FIG. 2, the seat bottom 12 may include a seat bottom frame 16. The seat bottom frame 16 may support a seat cushion upon which a seat occupant may be disposed when seated.

The seat back 14 may be configured to pivot or fold with respect to the seat bottom 12. As is best shown in FIG. 2, the seat back 14 may include a seat back frame 18 that may pivot with respect to the seat bottom frame 16 between an unfolded position and a folded position. In FIGS. 1 and 2, the seat back 14 and seat back frame 18 are shown in an exemplary unfolded position in which the seat back 14 may not be folded over the seat bottom 12. The seat back 14 may be folded over the seat bottom 12 when in the folded position. The folded position may also be referred to as a fold flat position in which the seat back 14 may be folded over the seat bottom 12 such that the seat back 14 may engage the seat bottom 12 and/or may extend in a generally horizontal direction.

Referring to FIGS. 2-6, the seat assembly 10 may include various components that may interconnect the seat bottom 12 to the seat back 14. In addition, the seat back 14 may pivot about multiple axes with respect to the seat bottom 12. In at least one embodiment, the seat assembly 10 may include a recliner mechanism 20, a lower bracket 22, an upper bracket 24, and a pivot mechanism 26.

Figure 6:
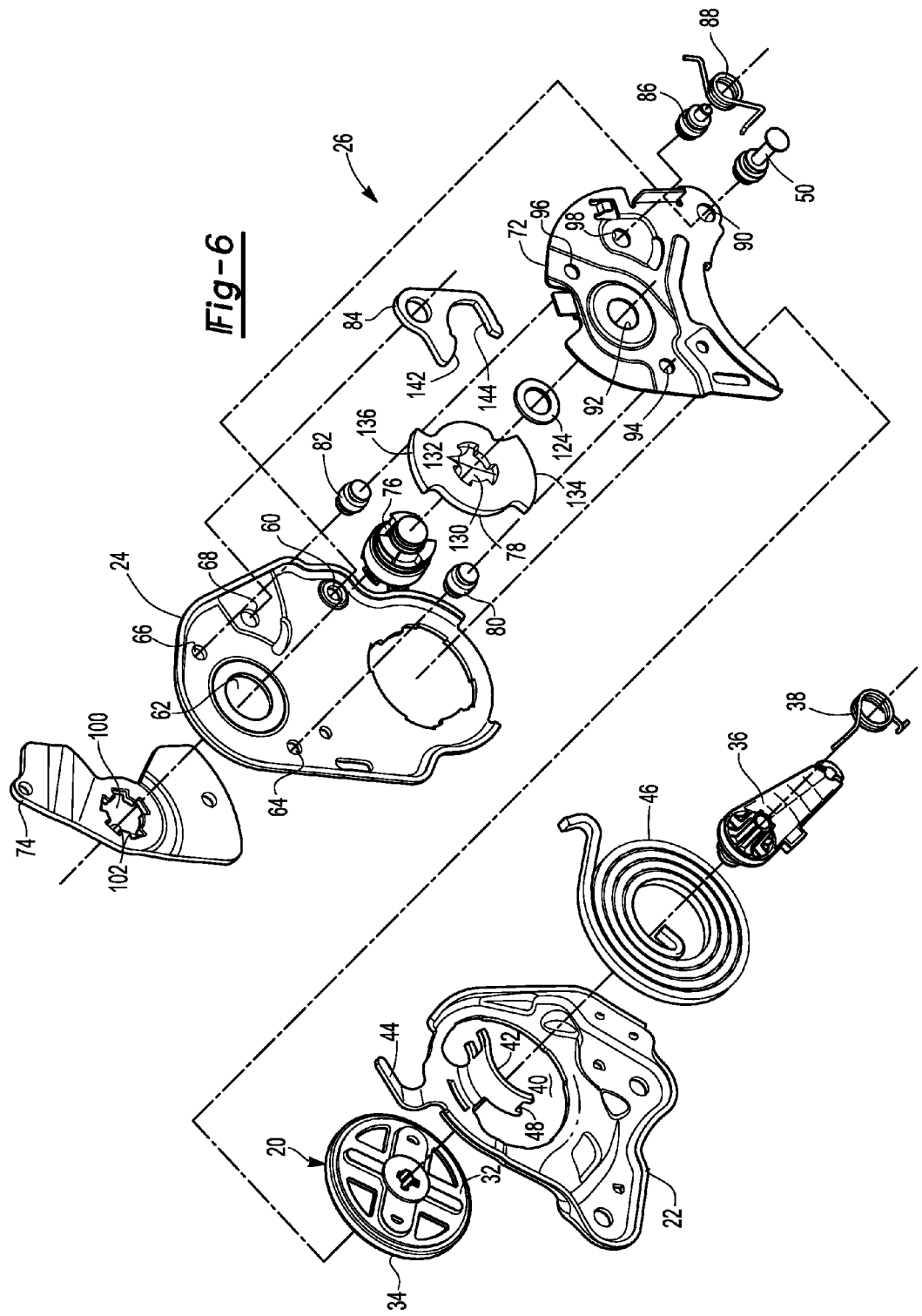
FIG. 6 is an exploded view of a portion of the seat assembly including the pivot mechanism.

The recliner mechanism 20 may be configured to control pivoting of the seat back 14 about a first axis 30. One or more recliner mechanisms 20 may be provided with the seat assembly 10. For example, a pair of recliner mechanisms 20 may be provided on opposing lateral sides of the seat assembly 10. As is best shown in FIG. 6, the recliner mechanism 20 may include a first plate 32 and a second plate 34 that may rotate about the first axis 30 with respect to the first plate 32. The first plate 32, which may also be referred to as a fixed plate, may be fixedly disposed on the lower bracket 22. The second plate 34, which may also be referred to as a rotating plate, may be fixedly disposed on the upper bracket 24.

The recliner mechanism 20 may be actuated between a locked position and a released position. Rotation of the second plate 34 with respect to the first plate 32 may be inhibited when the recliner mechanism 20 is in the locked position. Rotation of the second plate 34 with respect to the first plate 32 may be permitted when the recliner mechanism 20 is in the released position.

The recliner mechanism 20 may be actuated between the locked and released positions with a release lever 36. The release lever 36 may be coupled to a hub of the recliner mechanism 20 and may rotate the hub to actuate the recliner mechanism 20 between the locked and released positions. More specifically, the release lever 36 may be rotated in a first direction about the first axis 30 to actuate the recliner mechanism 20 from the locked position to the released position and may move in the opposite rotational direction to actuate the recliner mechanism 20 from the released position to the locked position. In one or more embodiments, the release lever 36 may be connected to one or more cables and/or a handle or other actuator to actuate the release lever 36.

A release lever spring 38 may bias the release lever 36 toward the locked position. From the perspective shown in FIG. 2-4, the release lever spring 38 may bias the release lever 36 in a counterclockwise direction about the first axis 30. In at least one embodiment, the release lever spring 38 may be configured as a coil spring that may include a coil portion, a first end, and a second end. The coil portion may extend around the first axis 30. The first end may engage the release lever 36. The second end may be disposed opposite the first end and may engage another component, such as lower bracket 22.

The lower bracket 22 may interconnect the seat bottom frame 16 to the recliner mechanism 20. More specifically, the lower bracket 22 may be fixedly disposed on the seat bottom frame 16 and fixedly coupled to the first plate 32 of the recliner mechanism 20. As is best shown in FIG. 6, the lower bracket 22 may include an opening 40, a dump spring mount 42, and a latch engagement feature 44.

The opening 40 may be disposed adjacent to the recliner mechanism 20. The release lever 36 may extend through the opening 40 to engage the recliner mechanism 20.

The dump spring mount 42 may be disposed proximate the opening 40. The dump spring mount 42 may extend away from the seat back frame 18 and the recliner mechanism 20. The dump spring mount 42 may be configured to support a dump spring 46 and may have a dump spring notch 48.

The dump spring 46 may be configured to exert a biasing force to rotate the seat back 14 toward the folded position. As is best shown with reference to FIGS. 3 and 4, the dump spring 46 may have a first end and a second end. The first end may be received in the dump spring notch 48 in the dump spring mount 42 to help secure the dump spring 46 to the lower bracket 22. The second end may be disposed opposite the first end and may be operatively connected to the upper bracket 24. For example, the second end may engage a dump spring pin 50 that may be disposed proximate one or more components of the pivot mechanism 26, such as the upper bracket 24.

Figure 4:
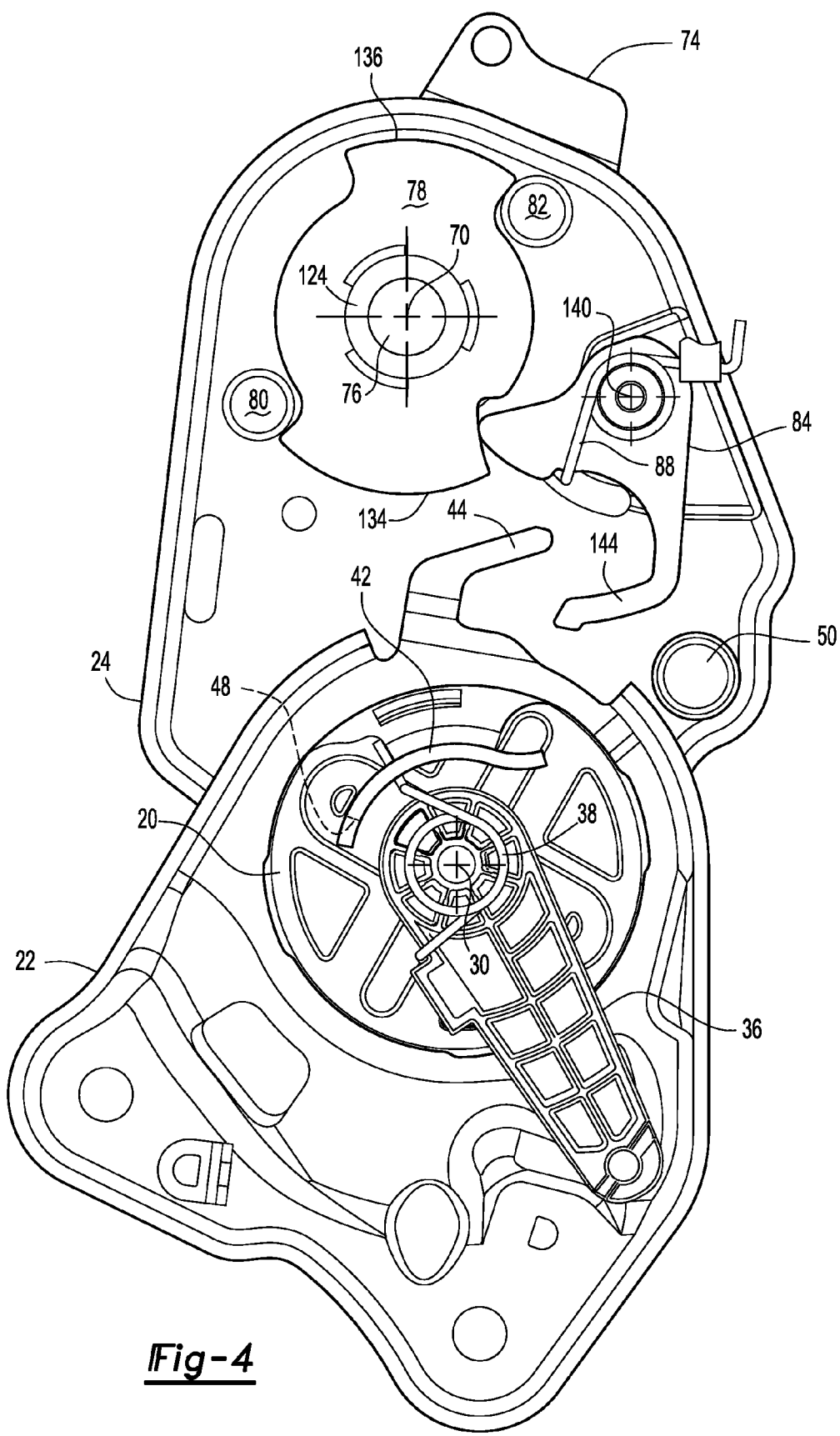
FIG. 4 is a side view of a portion of the pivot mechanism with the seat back in an exemplary unfolded position.

The latch engagement feature 44 may be disposed generally above the opening 40. The latch engagement feature 44 may be configured to actuate a latch as will be described in more detail below. As is best shown in FIG. 4, the latch engagement feature 44 may generally be configured as an arm or hook that may extend away from the seat bottom frame 16 and generally rearward or toward a region above the dump spring pin 50.

The upper bracket 24 may help interconnect the recliner mechanism 20 to the seat back frame 18. More specifically, the upper bracket 24 may be fixedly disposed on the second plate 34 of the recliner mechanism 20 and may be connected to the seat back frame 18 via the pivot mechanism 26. As such, the upper bracket 24 may pivot about the first axis 30 with respect to the lower bracket 22 when the recliner mechanism 20 is in the released position. As is best shown in FIG. 6, the upper bracket 24 may include a dump spring pin hole 60, a rivet hole 62, a first pin hole 64, a second pin hole 66, and a latch pin hole 68.

Figure 3:
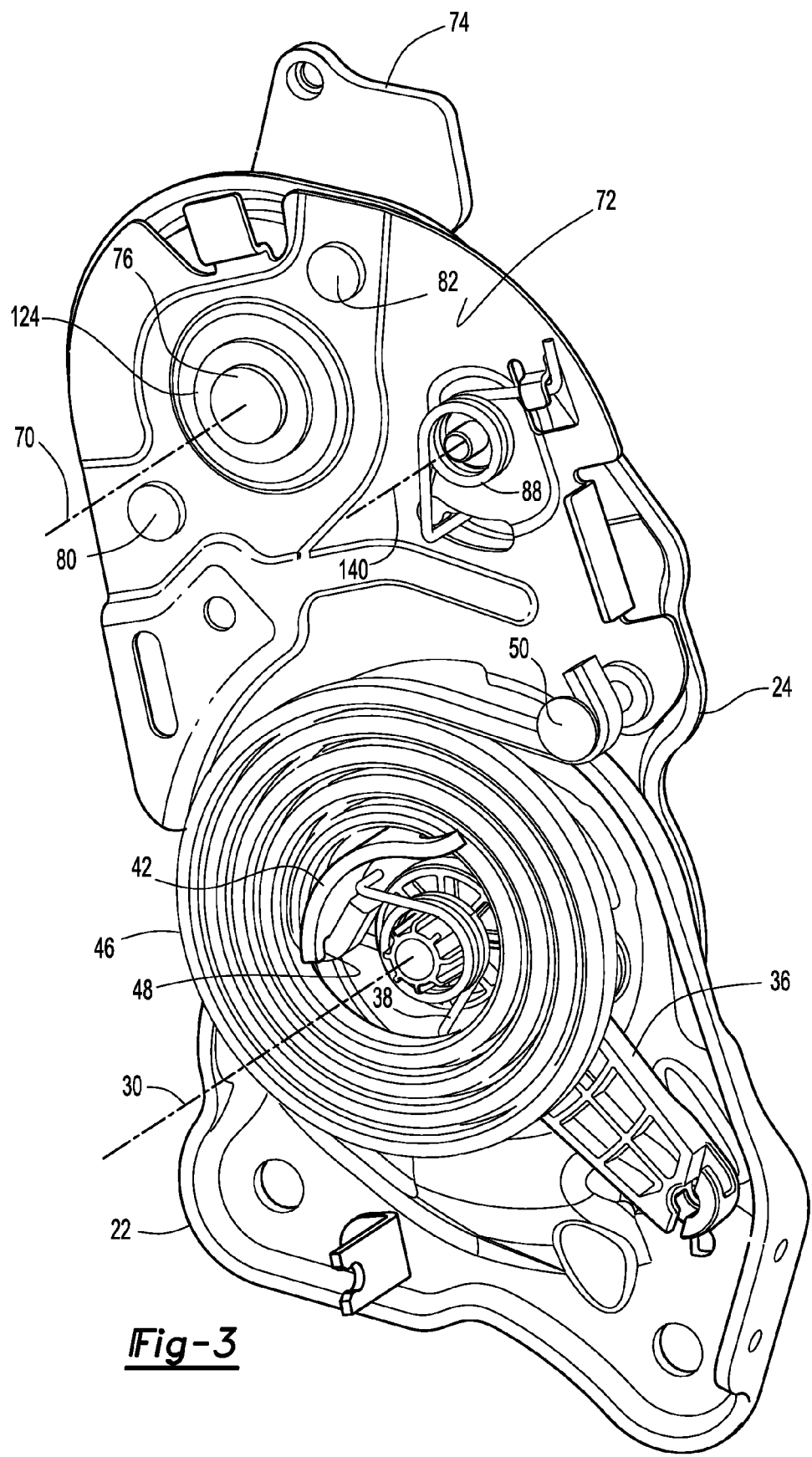
FIG. 3 is a perspective view of a portion of the seat assembly including a pivot mechanism.

The pivot mechanism 26 may facilitate rotation of the seat back 14 with respect to the upper bracket 24 about a second axis 70. As is best shown in FIGS. 3 and 4, the second axis 70 may be disposed above the first axis 30. In addition, components of the pivot mechanism 26 may be configured as a mirror image of what is shown in FIGS. 3 and 4 if provided on the opposite side of the seat assembly 10. As is best shown in FIG. 6, the pivot mechanism 26 may include a cover plate 72, an attachment plate 74, a rivet 76, a puck 78, a first pin 80, a second pin 82, a latch 84, a latch pin 86, and a latch spring 88.

The cover plate 72 may support various components of the pivot mechanism 26. The cover plate 72 may be fixedly disposed with respect to the upper bracket 24 and may be fixedly disposed on the upper bracket 24 in one or more embodiments. In at least one embodiment, the cover plate 72 may have a dump spring pin hole 90, a cover plate rivet hole 92, a first pin hole 94, a second pin hole 96, and a latch pin hole 98.

The dump spring pin hole 90 may receive the dump spring pin 50. The dump spring pin hole 90 on the cover plate 72 may be coaxially disposed with the dump spring pin hole 60 on the upper bracket 24. As such, the dump spring pin hole 60 may also receive the dump spring pin 50.

The cover plate rivet hole 92 may receive the rivet 76. The cover plate rivet hole 92 on the cover plate 72 may be coaxially disposed with the rivet hole 62 on the upper bracket 24. In addition, the cover plate rivet hole 92 on the cover plate 72 may have a smaller diameter than the rivet hole 62 on the upper bracket 24.

The first pin hole 94 may receive the first pin 80. The first pin hole 94 on the cover plate 72 may be coaxially disposed with the first pin hole 64 on the upper bracket 24.

The second pin hole 96 may receive the second pin 82. The second pin hole 96 on the cover plate 72 may be coaxially disposed with the second pin hole 66 on the upper bracket 24. The second pin hole 96 may be disposed on an opposite side of the cover plate rivet hole 92 from the first pin hole 94.

The latch pin hole 98 may receive the latch pin 86. The latch pin hole 98 on the cover plate 72 may be coaxially disposed with the latch pin hole 68 on the upper bracket 24. The latch pin 86 may be fixedly disposed on the upper bracket 24 and the cover plate 72.

The attachment plate 74 may be fixedly disposed on the seat back frame 18. The attachment plate 74 may be spaced apart from the upper bracket 24 to permit the seat back 14 to rotate about the second axis 70 and with respect to the upper bracket 24. The attachment plate 74 may also be fixedly disposed on the rivet 76. For example, the attachment plate 74 may have a rivet hole 100 that may be configured to receive the rivet 76. The rivet hole 100 may include a set of notches 102. The notches 102 may be spaced apart from each other and may extend radially with respect to the second axis 70 and away from the second axis 70. The notches 102 may mate with corresponding features on the rivet 76 to secure the attachment plate 74 to the rivet 76 as will be discussed in more detail below. In at least one embodiment, the attachment plate 74 may have a non-planar configuration and may be spaced apart from the seat back frame 18 proximate the rivet 76 such that the rivet 76 may be spaced apart from the seat back frame 18.

Figure 7:
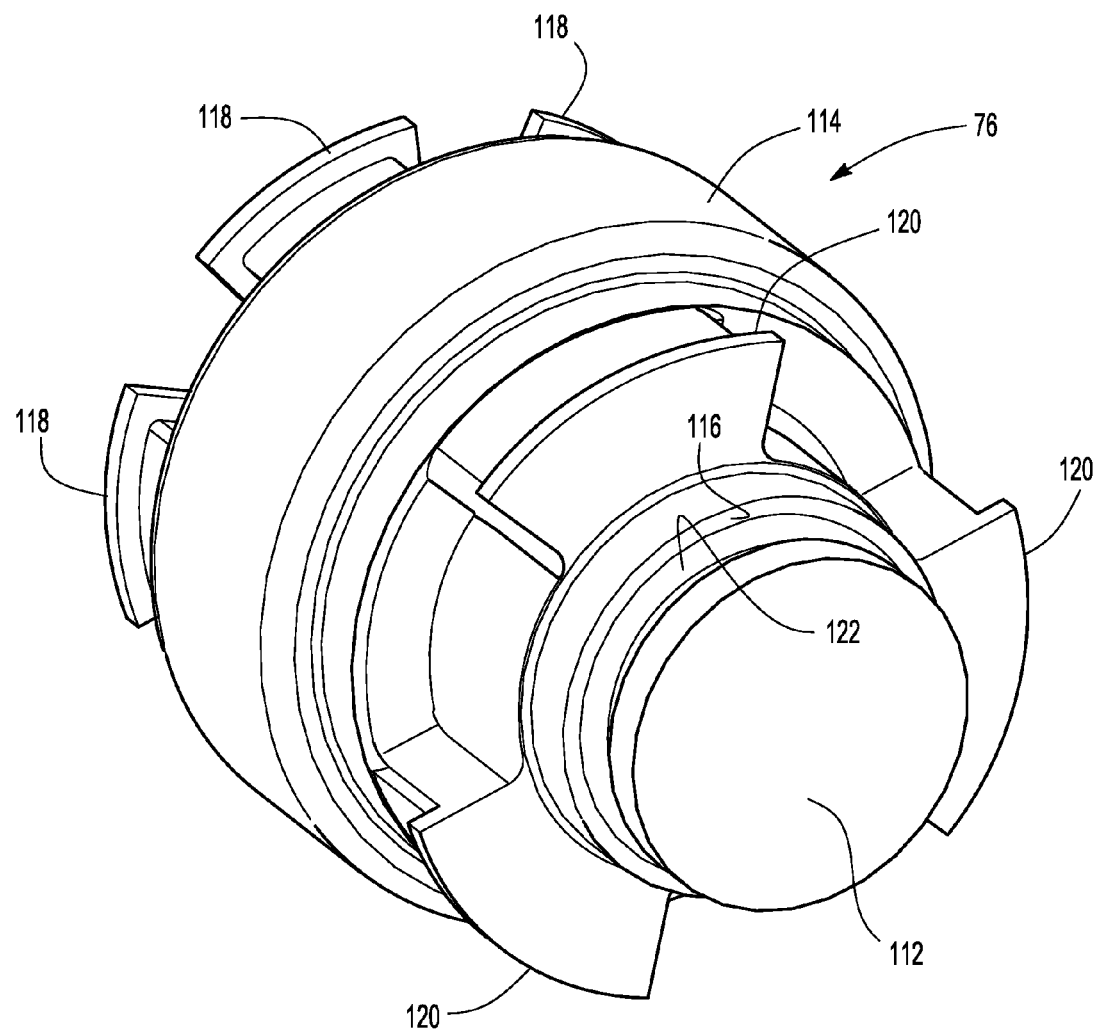
FIG. 7 is a perspective view of a rivet that may be provided with the pivot mechanism.

The rivet 76 may be configured to rotate about the second axis 70 with respect to the upper bracket 24 and the cover plate 72. The rivet 76 may extend through and may rotate within the rivet hole 62 on the upper bracket 24 and the cover plate rivet hole 92 on the cover plate 72. As is best shown in FIG. 7, the rivet 76 may have a first end surface 110, a second end surface 112, a first cylindrical portion 114, a second cylindrical portion 116, a set of attachment plate mounting tabs 118, a set of puck mounting tabs 120.

The first end surface 110 may be disposed proximate the attachment plate 74 and may face toward the seat back frame 18.

The second end surface 112 may be disposed opposite the first end surface 110.

The first cylindrical portion 114 may be rotatably disposed in the rivet hole 62 in the upper bracket 24. The first cylindrical portion 114 may be disposed between and may be spaced apart from the first end surface 110 and the second end surface 112. In addition, the first cylindrical portion 114 may be disposed between the set of attachment plate mounting tabs 118 and the set of puck mounting tabs 120. The first cylindrical portion 114 may have a larger diameter than other regions of the rivet 76.

The second cylindrical portion 116 may be rotatably disposed in the cover plate rivet hole 92 in the cover plate 72. The second cylindrical portion 116 may be disposed between the second end surface 112 and the set of puck mounting tabs 120. The second cylindrical portion 116 may have a smaller diameter than the first cylindrical portion 114. In addition, a groove 122 may be disposed proximate or provided with the second cylindrical portion 116. The groove 122 that may receive a fastener 124, such as a washer or snap ring, that may inhibit axial movement of the rivet 76 along the second axis 70. The fastener 124 may be disposed proximate or may engage the cover plate 72.

The set of attachment plate mounting tabs 118 may be disposed proximate or extend from the first end surface 110. The attachment plate mounting tabs 118 may be spaced apart from each other and may extend away from the second axis 70 or radially with respect to the second axis 70. Each member of the set of attachment plate mounting tabs 118 may be received in and may engage a corresponding member of the set of notches 102 on the attachment plate 74. As such, the attachment plate mounting tabs 118 and set of notches 102 may cooperate to fixedly secure the attachment plate 74 to the rivet 76 and inhibit rotation of the attachment plate 74 with respect to the rivet 76. In addition, the rivet 76 may be staked to or orbitally formed against the attachment plate 74. In the embodiment in FIG. 7, five attachment plate mounting tabs 118 are provided that may be equidistantly spaced, although a greater or lesser number may be provided in one or more embodiments.

The set of puck mounting tabs 120 may be provided between the first end surface 110 and the second end surface 112. The set of puck mounting tabs 120 may be spaced apart from each other and may extend away from the second axis 70 or radially with respect to the second axis 70. In at least one embodiment, the puck mounting tabs 120 may be spaced apart from the second end surface 112. The puck mounting tabs 120 may have a different configuration than the attachment plate mounting tabs 118. For example, the puck mounting tabs 120 may have a different size, shape and/or quantity than the attachment plate mounting tabs 118 and may not be aligned with or disposed directly opposite the attachment plate mounting tabs 118 in one or more embodiments. Such configuration differences may facilitate proper assembly as a misoriented rivet 76 may not mate with the attachment plate 74 and/or puck 78. In the embodiment shown in FIG. 7, three puck mounting tabs 120 are provided, although a greater or lesser number may be provided in one or more embodiments. In addition, the puck mounting tabs 120 are larger than the attachment plate mounting tabs 118.

Referring to FIGS. 4 and 6, the puck 78 may be disposed between the upper bracket 24 and the cover plate 72. As such, the puck 78 may be disposed on an opposite side of the upper bracket 24 from the attachment plate 74. The puck 78 may also be fixedly disposed on the rivet 76. For example, the puck 78 may have a hole 130 that may be configured to receive the rivet 76. The hole 130 may include a set of puck mounting notches 132. The puck mounting notches 132 may be spaced apart from each other and may extend radially with respect to the second axis 70 and away from the second axis 70. Each member of the set of puck mounting notches 132 may mate with a corresponding member of the set of puck mounting tabs 120 on the rivet 76 to fixedly secure the puck 78 to the rivet 76 and inhibit rotation of the puck 78 with respect to the rivet 76. In addition, the puck 78 may be disposed adjacent to the first cylindrical portion 114 of the rivet 76 and may be spaced apart from the second end surface 112 and the second cylindrical portion 116 of the rivet 76.

The puck 78 may include a first protrusion 134 and a second protrusion 136. The first and second protrusions 134, 136 may extend outwardly with respect to the second axis 70. The first and/or second protrusions 134, 136 may limit the rotational movement of the puck 78, rivet 76, and seat back 14 about the second axis 70 as will be discussed in more detail below.

The first pin 80 and the second pin 82 may be fixedly disposed on and extend from the upper bracket 24 to the cover plate 72. The first pin 80 may be spaced apart from the second pin 82.

The latch 84 may be disposed between the upper bracket 24 and the cover plate 72. The latch 84 may be pivotally disposed on the latch pin 86 and may be configured to rotate about a third axis 140. The third axis 140 may extend substantially parallel to the first and second axes 30, 70 and may be generally disposed between the first and second axes 30, 70. The latch 84 may have a puck engagement feature 142 and a lower bracket engagement feature 144.

The puck engagement feature 142 may be configured to engage the puck 78 to limit or inhibit rotation of the seat back 14 about the second axis 70. More specifically, the puck engagement feature 142 may engage the first protrusion 134 of the puck 78 to inhibit rotation of the seat back 14 about the second axis 70 as is best shown in FIG. 4 and may disengage the first protrusion 134 to permit rotation of the seat back 14 about the second axis 70 as is best shown in FIG. 5.

The lower bracket engagement feature 144 may be configured to engage the latch engagement feature 44 on the lower bracket 22 when the seat back 14 is sufficiently rotated about the first axis 30 as will be discussed in more detail below.

Referring to FIGS. 3 and 6, the latch spring 88 may be configured to exert a biasing force on the latch 84. The latch spring 88 may bias the latch 84 toward the puck 78. From the perspective shown in FIG. 2-4, the latch spring 88 may bias the latch 84 in a clockwise direction. In at least one embodiment, the latch spring 88 may be configured as a coil spring that may include a coil portion, a first end, and a second end. The coil portion may extend around the third axis 140. The first end may be mounted to and may engage the cover plate 72. For example, the first end may engage a tab on the cover plate 72 as is best shown in FIG. 3. The second end may be disposed opposite the first end and may engage the latch 84. More specifically, the second end may extend through a hole in the cover plate 72 and may be received in a retention notch that may be disposed proximate the puck engagement feature 142.

Figure 5:
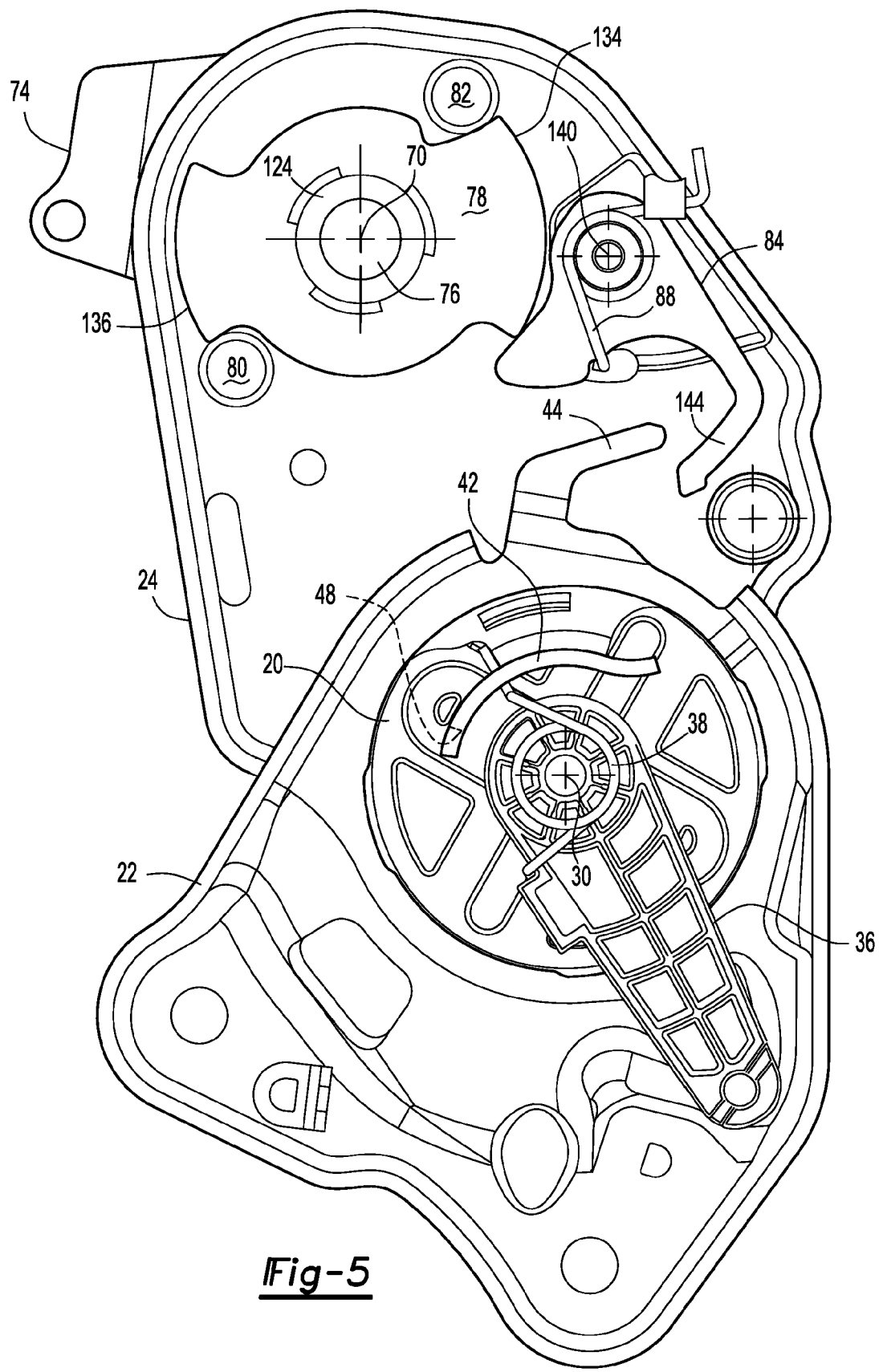
FIG. 5 is a side view of the pivot mechanism with the seat back in an exemplary folded position.

Referring to FIGS. 4 and 5, operation of the seat assembly 10 is will be described in more detail. In FIG. 4, the seat back 14 is disposed in an exemplary upright or unfolded position. The latch 84 is shown in a latched position that inhibits rotation of the seat back 14 about the second axis 70. More specifically, the puck engagement feature 142 of the latch 84 is in engagement with the first protrusion 134 of the puck 78 and the first and second protrusions 134, 136 engage the first and second pins 80, 82, respectively, to inhibit rotation of the seat back 14 about the second axis 70.

As previously discussed, the seat back 14 may pivot about the first axis 30 when the recliner mechanism 20 is moved from the locked position to the released position, or in a counterclockwise direction from the position shown in FIG. 4. Sufficient rotation of the seat back 14 may cause the latch engagement feature 44 on the lower bracket 22 to engage the lower bracket engagement feature 144 on the latch 84. Force exerted by the latch engagement feature 44 against the lower bracket engagement feature 144 may rotate the latch 84 about the third axis 140 in a counterclockwise direction from the perspective shown in FIG. 4 to an unlatched position, thereby causing the puck engagement feature 142 to disengage the first protrusion 134 of the puck 78. The puck 78, rivet 76, attachment plate 74, and seat back 14 may then rotate in a counterclockwise direction about the second axis 70 to the folded or fold flat position as shown in FIG. 5. Such rotation may be limited or stopped when the first protrusion 134 engages the second pin 82 and/or the second protrusion 136 engages the first pin 80.

The seat back 14 may be returned from the folded position to the upright position when sufficient force is exerted on the seat back 14. For example, force may be manually exerted on the seat back 14 to rotate the seat back about the second axis 70 in a clockwise direction from the perspective shown. Such rotation may then cause the seat back frame 18, attachment plate 74, rivet 76, and puck 78 to rotate in a clockwise direction about the second axis 70. Sufficient rotation of the seat back 14 may then allow the latch 84 to return to the latched position under the biasing force exerted by the latch spring 88. More specifically, the lower bracket engagement feature 144 of the latch 84 may disengage the latch engagement feature 44 of the lower bracket 22 when the seat back 14 is sufficiently rotated about the second axis 70, thereby allowing the latch 84 to rotate in a clockwise direction under the biasing force of the latch spring 88 from the perspective shown.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
    a recliner mechanism configured to rotate about a first axis;
    an upper bracket disposed proximate the recliner mechanism;
    a rivet that is disposed on the upper bracket and is configured to rotate about a second axis;
    an attachment plate that is fixedly disposed on the rivet and a seat back frame;
    a puck that is disposed on the rivet and that does not engage the attachment plate; and
    a latch rotatably disposed on the upper bracket that cooperates with the puck to control rotation of the seat back frame about the second axis.

2. The seat assembly of claim 1 wherein the attachment plate and the puck are disposed on opposite sides of the upper bracket.

3. The seat assembly of claim 1 wherein the attachment plate is spaced apart from the upper bracket.

4. The seat assembly of claim 1 further comprising a cover plate, wherein the cover plate is disposed proximate the upper bracket such that the puck and latch are disposed between the cover plate and the upper bracket.

5. The seat assembly of claim 4 wherein the rivet is rotatably disposed on the cover plate.

6. The seat assembly of claim 4 further comprising first and second pins that are disposed on the upper bracket, wherein the first and second pins are spaced apart from each other and limit rotation of the puck about the second axis.

7. The seat assembly of claim 6 wherein the first and second pins extend from the upper bracket to the cover plate.

8. A seat assembly comprising:
    a recliner mechanism that rotates about a first axis;
    a lower bracket that connects the recliner mechanism to a seat bottom frame;
    an upper bracket that extends between the recliner mechanism and a seat back frame;
    a rivet that extends through the upper bracket and is configured to rotate about a second axis;
    an attachment plate that is fixedly disposed on the rivet and the seat back frame; and
    a puck that is fixedly disposed on the rivet for controlling rotation of the seat back frame about the second axis;
    wherein the upper bracket is disposed between the attachment plate and the puck.

9. The seat assembly of claim 8 wherein the rivet has a first end surface and a set of attachment plate mounting tabs that extend from the first end surface.

10. The seat assembly of claim 9 wherein the attachment plate has a rivet hole that includes a set of notches that mate with corresponding members of the set of attachment plate mounting tabs to secure the attachment plate to the rivet.

11. The seat assembly of claim 9 wherein the rivet has a second end surface disposed opposite the first end surface and a set of puck mounting tabs that extend away from the second axis, wherein the set of puck mounting tabs are spaced apart from the first and second end surfaces.

12. The seat assembly of claim 11 wherein the puck has a hole that includes a set of puck mounting notches that mate with corresponding members of the set of puck mounting tabs to secure the puck to the rivet.

13. The seat assembly of claim 11 wherein the rivet includes a cylindrical portion that is rotatably disposed in the upper bracket and disposed between the set of attachment plate mounting tabs and the set of puck mounting tabs.

14. The seat assembly of claim 13 wherein the puck is disposed adjacent to the cylindrical portion and spaced part from the second end surface.

15. The seat assembly of claim 11 further comprising a cover plate that is disposed proximate the upper bracket and has a cover plate rivet hole, wherein the rivet is disposed in the cover plate rivet hole between the second end surface and the set of puck mounting tabs.

16. The seat assembly of claim 11 wherein the set of puck mounting tabs and the set of attachment plate mounting tabs have different configurations.

17. A seat assembly comprising:
    an upper bracket fixedly disposed on a recliner mechanism that rotates about a first axis;

a rivet that is disposed on the upper bracket and is configured to rotate with respect to the upper bracket about a second axis;

an attachment plate that is fixedly disposed on the rivet and fixedly disposed on a seat back frame;

a puck that is fixedly disposed on the rivet, wherein the puck has first and second protrusions that extend away from the second axis; and a latch disposed on the upper bracket and configured to rotate about a third axis;

wherein the latch engages the first protrusion to inhibit rotation of the seat back frame about the second axis and disengages the first protrusion to permit rotation of the seat back frame about the second axis.

18. The seat assembly of claim 17 further comprising a first pin that is fixedly disposed on the upper bracket, wherein the first protrusion engages the first pin when the latch engages the first protrusion.

19. The seat assembly of claim 18 further comprising a second pin that is fixedly disposed on the upper bracket, wherein the second protrusion engages the second pin when the latch engages the first protrusion.

20. The seat assembly of claim 19 wherein the first protrusion engages the first pin and the second protrusion engages the second pin to inhibit rotation of the seat back frame about the second axis.

* * * * *